US00RE36544E

United States Patent [19]

Madsen et al.

[11] E Patent Number: Re. 36,544

[45] Reissued Date of Patent: Feb. 1, 2000

[54] METHOD, A BINDER AND A BINDING MACHINE FOR CLOSING HOSE OR BAG SHAPED PACKINGS, PRIMARILY TUBULAR FOODSTUFF PACKINGS

[75] Inventors: Erik Madsen, Tranbjerg J.; Flemming Kroman, Braband, both of Denmark

[73] Assignee: Tamaco Pac A/S, Hφjbjerg, Denmark

[21] Appl. No.: 07/789,086

[22] Filed: Nov. 7, 1991

Related U.S. Patent Documents

Reissue of:

[64] Patent No.: 4,878,702
Issued: Nov. 7, 1989
Appl. No.: 07/055,366
Filed: May 29, 1987

[30] Foreign Application Priority Data

May 29, 1986 [DK] Denmark ..... 2508/86

[51] Int. Cl.[7] ..... B65D 27/30

[52] U.S. Cl. ..... 292/307 R; 29/463

[58] Field of Search ..... 292/307, 308, 292/309, 316, 318, 319, 322; 24/30.5 W, 30.5 P, 30.5 L, 30.5 R; 29/238, 463, 525

[56] References Cited

U.S. PATENT DOCUMENTS

| | | | |
|---|---|---|---|
| 2,809,651 | 10/1957 | Moberg | 292/307 R X |
| 3,257,695 | 6/1966 | Frame | 24/30.5 S |
| 3,503,119 | 3/1970 | Seitz, Jr. et al. | 24/30.5 W X |
| 3,571,861 | 3/1971 | Olson | 24/30.5 P |
| 3,854,482 | 12/1974 | Laugherty et al. | 292/322 X |
| 4,128,922 | 12/1978 | Hutchison | 24/30.5 R |
| 4,275,485 | 6/1981 | Hutchison | 24/30.5 P X |

FOREIGN PATENT DOCUMENTS

| | | | |
|---|---|---|---|
| K25163 | 3/1955 | Germany | 292/307 R |

*Primary Examiner*—Darnell M. Boucher
*Attorney, Agent, or Firm*—Antonelli, Terry, Stout & Kraus, LLP

[57] ABSTRACT

The closing of tubular casings containing foodstuffs by mounting a binder on a constriction of the casing involves the traditional problem of a high waste percentage due to the binders either damaging the casing material or sliding off the constriction. A method and a binder are proposed which makes it possible to obtain a very strong clamping of the binder without damaging the casing material, and, in connection with tight plastic casings, it is even possible to provide a "super tight" closure, by ranging the constriction with an oblong cross section between opposed straight clamping beams, which are forced together so as to produce a controlled deformation flowing of the casing material.

20 Claims, 4 Drawing Sheets

METHOD, A BINDER AND A BINDING MACHINE FOR CLOSING HOSE OR BAG SHAPED PACKINGS, PRIMARILY TUBULAR FOODSTUFF PACKINGS

Matter enclosed in heavy brackets [ ] appears in the original patent but forms no part of this reissue specification; matter printed in italics indicates the additions made by reissue.

BACKGROUND OF THE INVENTION

The present invention relates to a method of closing hose or bag shaped packings, primarily foodstuff packings, whereby a constricted portion of the packing is clamped by a ring shaped non-metallic clamp binder, which is caused to be narrowed about the constriction by a closing pressure applied from opposite sides thereof and is fixed in its shape as attained when it is subjected to a closing pressure.

Typical packings will be sausage articles, which have a porous sausage skin of a fibrous material, and bag or sausage shaped packings for other kinds of foodstuffs, e.g. soups, the packing material here being a tight, tubular plastic sheet material. The sausage skin materials are porous because the products should be subjected to a smoking treatment, whereby they are given both a desired taste and a long durability, while the plastic sheet material should be as tight as possible for rendering the packed products as durable as possible.

In both cases almost the same problem exists, namely that the binding of the constrictions should be effected very tightly such that in case of sausages the clamp binders will not slide on the normally very slippery sausage skins before and during the smoking, while the clamps when mounted on the plastic sheet envelopes should likewise be nonslidable, but also provide for an effective sealing against penetration of air. In both cases it is normally necessary to make use of clamping forces which are so high that a potential danger of the sheet material being damaged will exist, and, in fact, it is well known that in the relevant productions a most significant waste on this account is being experiment.

For these types of bindings it has been customary, almost exclusively, to use binders of the metallic clip type, i.e. U- or C-shaped metal strips, which are introduced over a constriction area of the packing and bent by reasonably high damping forces so as to be closed as a ring about the constriction. Much could be said about the advantages and disadvantages of these metal clips, but here it should just be mentioned that they are responsible for the high waste, because they have a limited ability to hold the material tightly clamped, and that they show a major disadvantage in just being of metal. Generally, according to modern standards, any kind of metal is unwanted in connection with foodstuff articles. It is relevant to mention also that it has been found that the metal clips are simply unable to close the plastic sheet packings with any particularly high degree of tightness, at least not without an associated highly potential danger of damaging the material so that the closure will be untight anyhow. Through the recent years several extremely tight plastic sheet materials have been developed for incoming the storage durability of the various foodstuff products, but it has been realized that these developments are in fact superfluous as long as the materials cannot be closed with the same high degree of tightness.

Already for leaving the use of metal there have been some attempts to make use of plastic binders, but the designs of these binders have not been suitable for use with large size packings, i.e. packings with relatively thick constriction area. An advantage of the plastic binders, apart from their not being of metal, is that they may be provided with locking means such that they may be tightened about the constriction area and be fixed in a closed ring shape, whereby they may clamp the constriction area with high forces without these forces being limited by the ability of the binder material to retain a bent shape against return-bending forces from the clamped constriction area.

The already known plastic binders, however, suffer from various drawbacks which will not be discussed in great detail in the present context. Generally they are based on the same basic ideas as the metal clips, namely that they should serve to surround the constriction area with sufficient tightness to be non-slidingly secured and to provide a high degree of sealing of the constriction area. Most of the known plastic binders are unusable for large size packings because they comprise a U-shaped portion, the legs of which are received in a hole in an opposed counter portion, whereby the constriction material will be clamped against the edges of the receiver hole, and this may give rise to concentrated clamping forces which cause a rupturing of the sheet material.

There are not either, so far, any reports on plastic binders being applicable to effect any "super sealing" of the relevant constriction areas.

In connection with the invention a major problem has been found in the fact that it is in no way ideal to effect a binding of a constriction area by way of a circularly annular binder or a binder having major portions shaped in this manner. Experiments and calculations have shown that what happens is a peripheral compaction which forms a barrier against the clamping pressure being transferred to the inner portions of the constriction area. When a high pressure is applied the relatively thin layer of the compacted peripheral material will be axially displaced by flowing, but since the material is frictionally cohering with the inner material the latter will be away drawn by such displacement and deformation of the outer material. This drawing is effected based on the resiliency of the nonflowing material, and it may well happen that by an applied high clamping pressure the inner material next to the material in the zone of flowing material will hereby be stretched beyond its so-called rupture prolongation, i.e. the material will burst.

The above considerations apply to casing materials of plastic, but similar considerations may apply to casings of fibrous material, and in both cases the result will be that in fact none of the known binders are optimal with respect to creating a high clamping pressure in a safe manner, i.e. without damaging the casing material.

The considerable waste should be seen on the background that apparently it has not earlier been realized what is really happening in the constriction area when a high clamping pressure is applied from binder portions of various configurations, and it is believed that the present invention represents a pioneer work in this respect. For the normal use of metal clips it is typical that some empiric tests are made at the beginning of a production, such that the waste can be held as low as possible and that an attempt to reduce the waste further by lowering the clamping pressure will only result in a similar or even worse waste, now not by rupturing the material but by the binders not being safely held on the casing. It is a traditional counter measure to mount two or more clips at each constriction, but the waste percentage will still be high, and as far as an extremely scaled closing is concerned such a series of clips will be of no help at all, as none of the clips will have any chance of providing for a "super sealing".

As will be apparent from the foregoing the main purpose of the invention is to provide a method and a binder which will enable the constrictions to be bound by a relatively high binding pressure with a very low risk of the constriction material being damaged, such that the waste can be reduced considerably or even be eliminated. Based on the same contribution it is a further purpose of the invention to provide a method and a binder which will be applicable for obtaining a "super sealed" closing of the constrictions, this of course also being of utmost importance.

According to the new concept of the invention it has been found that for a practically ideal relation between a high clamping pressure and a low risk of damaging the casing material the constriction area should be clamped between opposed surface portions of substantially straight camping beams of the binder clamp and be caused to be compacted into a final shape, in which it is cross sectionally oblong in the longitudinal direction of the substantially parallel clamping beams, preferably with a length at least twice the distance between the clamping beams. Obviously the applied clamping pressure and the size of the binder should still be adapted to the particular production, but already with a conventional adaptation in this respect, i.e. by empirical selection of the conditions, the result will be a drastic reduction of the waste percentage, because with the said disposition of the constriction area between substantially parallel clamping beams a relatively very high clamping pressure can be applied without damaging the casing material.

The invention is based on advance studies of the behaviour of the casings material in the constriction area when exposed to a clamping pressure, and it has even been found that it is possible to select a correct binder and clamping pressure based on the known basic or starting parameters of the process, i.e. the dimensions and material constants of the casing material, thus without relying solely on empirical tests. It is believed, however, that in the present connection it will be unnecessary to elucidate the theoretical basis of the invention when the result thereof can be expressed in terms of concise and novel method and design conditions.

Briefly, the physical effect of applying the clamping pressure between straight and parallel clamping beams will be that the clamping pressure is transferred to the inner material portions in the constriction area without being hindered by any compaction taking place lengthwise of the clamping beams as would occur along curved clamping means, and the clamping pressure, therefore, will be taken up by the constriction area in a relatively very "soft" manner involving no drastic differences in the behaviour of the different neighboring layers of the material in the area. Correspondingly, the physical effect of the constriction area being elongated in the direction is that the degree of compaction of the constriction area will be relatively small, whereby it is ensured that the different material portions as frictionally engaging each other by the compression thereof will not give rise to substantial rubbing effects, such that the casing material is unlikely to be ruptured hereby.

The required clamping together of two opposed clamping beams to a desired final position is achievable with the use of clamping beams, which are essentially rigid or stiff, and which are interconnected endwise through tensile strong leg portions, of which at least one is adapted to be received in a receiver opening in the opposite clamping beam in a length variable and fixable manner. In any production there will be some variations in the general thickness of the constriction areas, and, consequently, the leg portion will intrude more or less in the receiver opening or even protrude more or less from the rear side of the opposite clamping beam. Correspondingly, in order to limit the number of different standard binders it may be desirable, for a given production, to select a binder type which will give rise to such rearwardly protruding leg ends, and generally this will be disadvantageous in that projecting binder portions will present a tearing risk towards neighboring packings. In the prior art, as far as plastic binders are concerned, the same problem has existed, though to a much higher extent because of the larger displacement of the leg portion during the clamping operation, and it has been suggested in that connection that the problem of the widely rearwardly projecting leg ends may be solved by simply cutting away these protruding portions immediately at the rear side of the binder portion from which they project. This, however, has turned out to be an unacceptable solution of the problem, because in connection with the production of foodstuff products it is highly unacceptable to have loose cut off binder portions occurring together with the products themselves.

With the present invention it is ensured that a given binder type having a specific length of the leg portion is usable in connection with an increased number of different products and their associated variations of the general thickness of the constriction areas, because with the oblong configuration of the clamped constriction area the intrusion or protrusion of the leg portion into or beyond the receiver opening will vary relatively little due to the associated small clamping displacement of the leg portion. It is practically possible, therefore, to entirely avoid the cutting of the leg portions by prescribing either the use of such a thickness of the receiver clamping beam that the end of the leg portion will remain inside the receiver opening despite the occurring thickness variations of the constriction areas or, where the leg members will protrude moderately from the rear sides of the receiving clamping beams, that the outer ends of the leg portions be smoothly rounded so that these end portions will not present any tearing risks. Hereby each standard binder type will be applicable for the binding of both a variety of different products and for the binding of standard products showing a low tolerance with respect to the general thickness of the constriction areas, without the end portions of the leg members having to be cut away.

While these results of the invention are highly important it may be still more important that the invention provides for a practical possibility of a "super sealed" closure to be obtained in a well defined and reproduceable manner. It has been found that the main condition of a super tight closure is in fact rather simple to formulate and to realize based on the principles of the invention, while at the same time it has been made clear why such a closure is otherwise practically unachievable.

In order to provide a full sealing all material portions across the constriction area should be pressed firmly together as well a firmly against the surrounding clamp. Inside the constriction area and on the surface thereof, due to wrinkles and foldings of the casing sheet, there will exist a plurality of unclosed narrow channels, which will not be closed merely by a pressure sufficient to force the sheet surface sub areas tightly together. In order to close these channels it is simply necessary to subject the material at each relevant place to such a high pressure that the plastic material is deformed, by a real deformation flowing, and because the wrinkles may occur all over the constricted area the condition of really producing a totally sealed closure will be that each and all sub portions of the constricted area are subjected to such a high deformation pressure without any portion thereof hereby being fractured.

The building up of such a high and non-damaging pressure even inside the central portion of the area is generally possible with the use of the method according to the invention, while with the use of the conventional metal clips there are several sub areas in which the pressure will be either too high or too low, or, in other words, it is impossible to avoid the situation that the pressure is suitable in some sub areas without being either too low or too high in other sub areas, whereby the result is bound to be unsuccessful.

Some of the already known plastic binders could be better suited for providing a less varying pressure in the constriction area but here one problem is that the sheet material, as already mentioned, is forced against the edge of a hole so as to really burst at this place by an applied high pressure, and another problem is that in the prior art it has generally been endeavored to produce a finally bound constriction area of approximately uniform thickness and width. It has now been found, both theoretically and experimentally, that a deformation pressure midways in the constriction area cannot in practice be built up without the remaining material being damaged unless the thickness, i.e. the distance between the opposed clamping beams, is noticeably smaller than the width of the area. Likewise it is important that the binding is effected between substantially straight, opposed clamp portions.

In practice, in a given production, it should of course be ascertained that the clamping pressure is adjusted so as to be effective for the deed result to be obtained, i.e. high enough to cause an overall flowing deformation of the material, but without having caused damage to any part of the material. These functions cannot be directly observed, but test samples may be produced for being tested and inspected. The fulfilling of the conditions for obtaining a "super sealed" closure according to the invention can be verified by removing the clamp and broadening out the tubular casing material of the constriction and then (1) inspecting the material for observable fractures, and (2) measuring the sheet thickness all the way round to make sure that at every sub area the sheet material has undergone the deformation flowing, this being inherently connected with an axial displacement of the material and therewith with a permanent thickness reduction thereof. Thus, when the material is unbroken and is of reduced thickness all the way over the former constriction area then the applied pressure has been correct and applied correctly for providing the super sealing effect, and the production may start or continue with the same mounting conditions for mounting the binders of the particular selected type.

With the use of plastic binders it is inevitable that the binder after the fixation thereof and after the removal of the applied prong tools will expand somewhat under the influence of the resilient expansion forces in the compressed material in the constriction area. Normally this will be acceptable, because it has been found that the high degree of sealing as having been achieved by the applied high clamping pressure will remain unchanging high even by a considerable pressure relief thereafter.

The fixation of the binder, i.e. the locking of the connector legs to the clamping beams, should be effected such that no significant return movement will occur after the relief of the clamping tool pressure. According to the above, however, a certain small amount of return movement may be acceptable anyway, which may largely facilitate the designing of well suited binders.

For achieving a perfect sealing of or in the constriction area it will normally be necessary to compress the material by some 10–50% all according to the cross sectional shape of the area and the E-module of the particular plastic sheet material, i.e. a quite considerable axial displacement of the material should be effected for making sure that all kinds of axial leaks have been sealed off. Particularly with the use of sheet materials of a low E-module it may be disadvantageous for the integrity of the material to use a strongly binding ring member of small "height", i.e. of a small axial dimension, because the outermost material in the constriction area may then burst by the forceful clamping together of the correspondingly thin clamping beams of the binder. Ideally for this purpose a rather high or long binder should be used, which will distribute the pressure over an enlarged outer area of the constriction and thus be more lenient to the sheet material. This material should still be clamped sufficiently for an overall expansion in the axial direction, but with the use of a relatively long binder the axial expansion will be smoothened out and be partly suppressed in that the expansion forces will be taken up by counterresilient forces from the material portions frictionally held by the binder adjacent the axial end portions thereof.

However, such long binders will be correspondingly expensive, and for the invention it is in important recognition that a corresponding result win be obtainable with the use of "short" binders, viz. by a suitable design of the tools used for the clamping actuation of the binders. Thus, this desired effect will be achievable by externally holding the material of the constriction area just outside the binding area in such a manner that the held material cannot be freely axially displaced, this being effectable by means of special clamping tool portions, which, in conjunction with the clamping together of the binder, will clamp against the constricted material area just outside the opposed ends of the binder. Hereby there is provided a frictional resistance against the axial expansion of the material, what will correspond to an increase of the E-module in the actual binding area such that high clamping forces may be applied to a "short" binder without the material being damaged. When the clamping pressure is relieved and the clamping tool portions are removed the binding pressure may cause a certain post-expansion, but as already mentioned it will be unimportant whether an associated pressure reduction inside the bound area will occur, when it has only previously been ensued that a real compaction and axial displacement of all sub portions of the material in the binding area has been obtained.

It is important that the binder opening is beforehand disposed approximately in accordance with the cross sectional shape of the constriction area, such that the casing material by its compaction between the clamping beams shall not have to be widely laterally deformed in order to engage the cross leg connection between the clamping beams.

The invention, which is more closely defined in the appended claims, will now be described in more detail with reference to the accompanying drawing.

DETAILED DESCRIPTION

Figure 1:
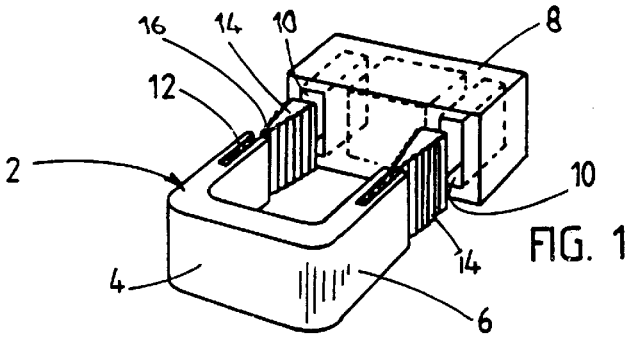
FIG. 1 is a perspective exploded view of a binder according to the invention.

The binder shown in FIGS. 1–4 includes a U-shaped member generally designated by the reference numeral 2 having a clamp beam 4 and two legs 6, and a relatively thick, loose clamp block beam 8 with two throughgoing holes 10 for accommodating the legs 6. The ends of the smooth legs 6 are provided with longitudinal slots 12 having slightly undulated side walls, and on each leg end is provided a wedge body 14, forwardly protruding and held by an easily breakable connection 16 to the leg end such that the connection 16 is broken when the wedge body 14 is pushed into the slot 12, whereby the leg end portion will be laterally expanded. Also the lateral walls of the wedge body 14 are undulated.

Figure 2:
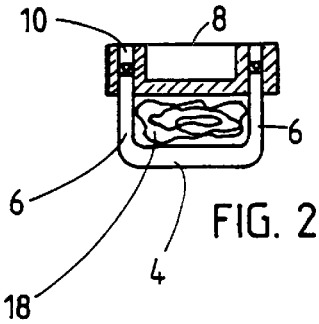
FIGS. 2–4 are schematic views illustrating the use of the binder.

The wedge bodies 14 are located such that they may be introduced into the holes 10, see FIG. 2, when the two binder parts 2 and 8 are brought together about a constriction 18 on a tubular packing having an outer sheet casing. By a further pressing together of the parts as illustrated by pressure arrows in FIG. 3 the clamp beams 4 and 8 are caused to effect a desired, predetermined closing pressure on the constriction 18, which is hereby compressed to a certain thickness within a given tolerance range. For the particular production a clamp 2,8 has been selected, which is adapted to the total cross sectional area of the casing sheet such that in the find position the constriction 18 will fill out, entirely or just almost, the full space between the legs 6 when the binding area of the binder has adopted a shape which is oblong in the longitudinal direction of the parallel beams 4 and 8. Preferably, the width between the legs 6 should be at least twice the distance between the beams 4 and 8.

Figures 3, 4:
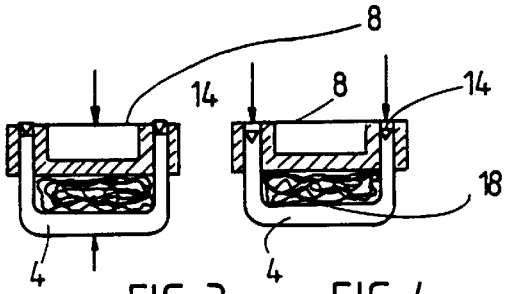

When the binder assumes its final position between non-illustrated clamping tools, the wedge bodies 14 are pressed or beaten into the slots 12, see FIG. 4, whereby the end portions of the legs 6 will expand inside the holes 10 and thus be locked against retraction therefrom. For improving this locking the holes 10 may diverge slightly rearwardly or be provided with a slightly narrowed entrance end.

If the product to be bound is of the sausage type, i.e. having a porous casing, it will be sufficient if the space between the legs 6 is just almost filled out by the constriction 18, while if, a super tight closure of a plastic casing is desired this space should be entirely filled out, as explained below in more detail. However, in both cases the oblong shape of the constriction area between the beams 4 and 8 will condition a relatively high clamping pressure to be used without the casing material bursting, so in both cases an exceptionally firm holding of the clamp on the constriction is achievable.

Moreover it can be ensured in both cases that the free ends of the legs 6 may be located entirely within the holes 10, such that they will not form rearwardly protruding tearing members. This will be a question of adapting the thickness of the block beam 8 to the expected or known tolerance of the total cross sectional area of the casing as forming the consecutive constrictions 18. In practice, of course, only a limited number of block beams 8 with different thickness will be available for a correspondingly limited number of different distances between the holes 10, but even so it has been found that relatively few different standard binder sizes will be sufficient for the practical demand. It may happen that the leg ends will protrude somewhat from the rear side of the block beam 8, irrespective of the manner in which the legs 6 are fixed to the block beam 8, and this may be acceptable if the free ends of the legs 6 are shaped smoothly rounded to still not form regular tearing members and still not require to be cut off.

The problem as to freely projecting leg ends might of course be overcome by using very thick block beams 8 as a standard, but any unnecessary oversize will imply unnecessary costs, and this is important because binders for the discussed purposes are used in millions or rather billions.

As mentioned the opposed clamp beams 4 and 8 should ideally be straight and remain straight, though a slightly arched shape could be acceptable. The constriction 18 will seek to expand and thus to bend the beams 4,8 outwardly. The block beam 8, due to its enlarged thickness will not easily bend, but the beam 4 would have to be equally heavily designed if it should resist any trace of bending out once the clamping tool pressure has been relieved. To avoid such overdimensioning of this beam 4, the tool clamping pressure may be increased to somewhat above the desired final pressure, such that just this pressure is established when the binder leaves the tools and the beam 4 is bent out slightly by the internal pressure of the constriction 18. Alternatively the clamping pressure could be applied between the block beam 8 and the local foremost end areas of the legs 6, i.e. on the outer ends of the beam portion 4, and this beam portion could extend slightly inwardly curved so as to be straightened out when the clamping pressure is applied to the foremost leg end areas only. Also, the clamping tool cooperating with the beam 4 may be slightly curved to produce the same result.

Figure 5:
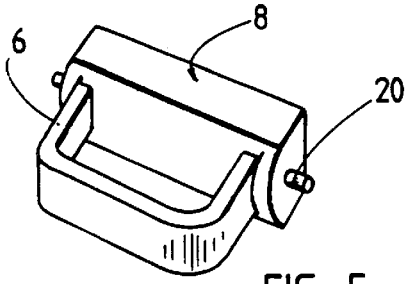
FIGS. 5 and 6 are a perspective and a sectional view, respectively, of a modified binder.
Figure 6:
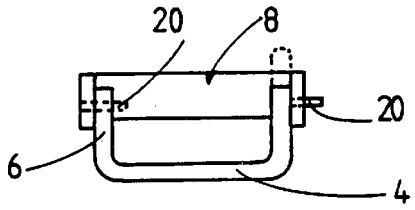

In FIGS. 5 and 6 is shown a binder, in which a metal pin 20 is prepositioned in the respective end portions of the block beam 8 without from the beginning projecting into the respective holes 10. It will be appreciated that the legs 6 are here lockable in their final positions by the pins 20 being forced towards each other so as to penetrate the leg end portions and intrude into the interior wall material of the holes 10, as shown in the left hand side of FIG. 6. As shown in dotted lines in the right hand side thereof the free end of the legs may be smoothly rounded as suggested above, such that they need not be cut away even if they finally project somewhat beyond the rear side of the block beam 8.

Figure 7:
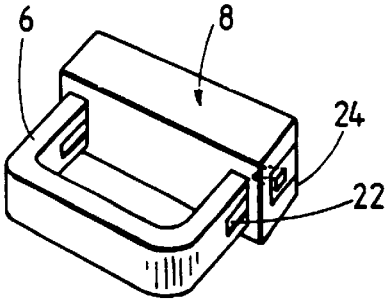
FIGS. 7 and 8 are corresponding views of two other embodiments of the binder.

In the binder shown in FIG. 7, the legs 6 are shaped with transverse middle slots 22, which may cooperate with a wedge member 24 associated with the respective end portions of the block beam 8, provided in a recess therein and operable to be pushed inwardly into the slot 22 for locking the leg ends by expansion thereof.

Figure 8:
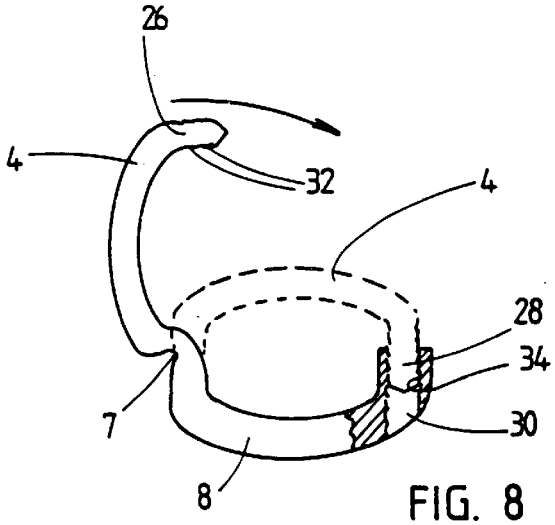

In FIG. 8 is shown a binder in which the beam portions 4 and 8 are permanently interconnected at one end through a leg portion 7, which constitutes or includes a hinge portion, whereby the two beams 4, 8 are closable from the opened position shown in full lines to the closed position shown in dotted lines. Hereby a free leg portion 26 on the beam 4 is introduceable into an apertured leg portion 28 on the free end of the beam 8, the aperture being designated 30. The leg portion 26 is provided with barb like protrusions 32 and the aperture 30 has corresponding, inverted barb portions 34, which will effectively hold the leg portion 26 against retraction from the hole 30 once it has been introduced therein. In this case, as could be the case with the legs 6 of the foregoing Figures, the leg is not fixable exactly in the position in which it is left by the final clamping pressure on the beams 4 and 8, but as mentioned hereinbefore a small degree of retraction will normally be acceptable. The beams 4 and 8 could be straight as in the other examples, but FIG. 8 illustrates that some slight curving of the beams may be acceptable, as it would even in the other Figure. When the length of the leg 7 is not adjustable the beams 4 and 8, in their final positions, may not be fully parallel, but again, a small deviation from the ideal circumstances will generally be allowable without the major advantages being sacrificed.

Figure 9:
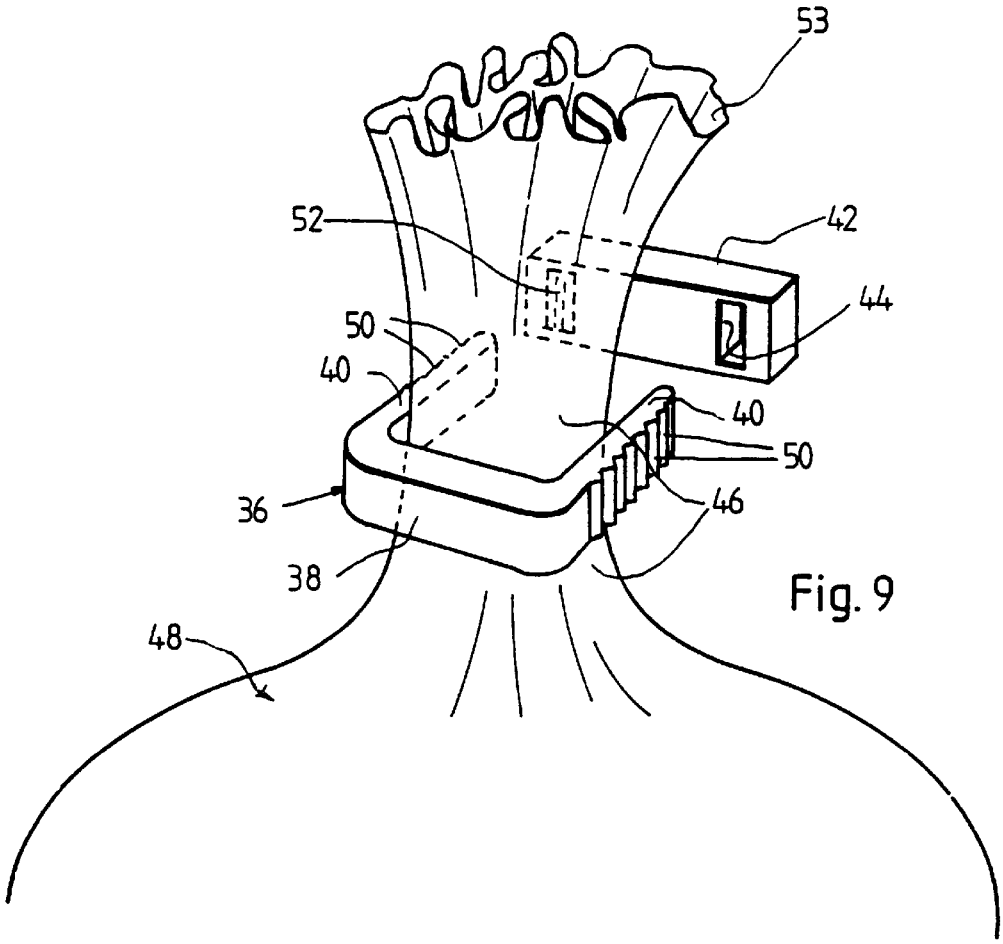
FIG. 9 is a perspective view of still a further binder embodiment, shown preparatory to being used.

In FIG. 9 is shown a plastic binder comprising a U-shaped member 36 having a bottom beam 38 with forwardly protruding legs 40 and a loose cross beam 42 shaped with holes 44 for receiving the legs 40. It is indicated that the U-member 36 is inserted laterally over a constricted area 46 of a tubular packing 48, which may contain a rigid, semi rigid or liquid foodstuff. The outsides of the legs 40 are provided with small barbs 50 adapted to cooperate with corresponding holding ribs 52 on the outer side walls of each of the holes 44.

The binding of the constriction area 46 is effected by a simple forcing together of the beam portions 38 and 42 with the legs 40 received in the holes 44. The objective here is to effect a "super sealed" binding of the constriction area 46 of a very tight packing material designated 53 of plastic. It is not presupposed that this material is particularly orderly disposed in the constricted area by a controlled pleating or otherwise, but only that the material has been gathered together and is now located inside the opening of the U-member 36, whereafter this member is brought together with the cross beam 42.

Figure 10:
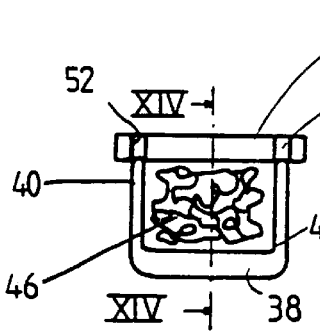
FIGS. 10–13 are plan views illustrating the progress of a "super sealing" binding.

In this initial phase in which the ends of the legs 40 may only just reach the front ends of the holes 44 when the sheet material of the constriction 46 starts to resist the moving together of the beams 38 and 42, the sheet material 53 will thus still be only loosely packed together, and it will not even fill out the binder opening, see FIG. 10.

Figure 11:
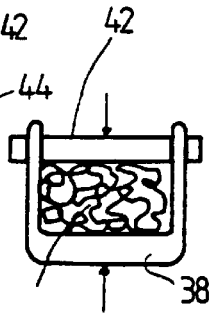

In a following second phase, see FIG. 11, the beams 38 and 42 are forced together until a full compaction has been established, i.e. until practically all axial passageways through the binder area have been closed, principally corresponding to the area of the binder opening now being almost equal to the total cross sectional area of the tubular material 52. The material 53 will be subjected to the highest pressure in the areas thereof which are located directly adjacent the middle areas of the opposed clamping beams while the pressure will decrease towards zero adjacent the corner areas as long as the deformable sheet material may still seek outwardly towards these areas. Just because the material is deformable it will hereby, in the areas of the said higher pressure be somewhat axially expanded before an initial building up of the pressure adjacent the corner areas, and when this happens the total cross sectional area of the sheet material will already be somewhat reduced compared with the same area in a free condition of the sheet material.

The sheet material will be pressed laterally outwardly against the middle portions of the legs 40 already before the material is pressed out into the corners of the binding opening, and at these places, therefore, a pair of opposed compression areas will occur, which, via the internal friction in the material of the compacted constriction area, will act as pressure bridges between the respective opposed end portions of the clamping beams 38 and 42. Hereby the applied clamping force on the clamping beams 38, 42 will not be immediately transferred to the central area of the binding area, and also for this reason the provision of an initial pressure build up in each and every portion of the binding cross section will require an already established, relatively considerable clamping force on the clamping beams, whereby a certain axial expansion will be applied to the sheet material located immediately next to the middle portions of the clamping beams 38,42 and the connector legs 40, respectively.

It is corresponding circumstances which, as mentioned, will make it impossible to obtain a sufficiently high closing pressure in a constriction area which is narrowed generally along a circular peripheral length or partial length, because an associated building up of a peripheral pressure bridge may simply prevent any considerable pressure build-up in the central area as long as the applied pressure is not so high as to damage the surface material.

The same will apply to the binder shown if the effective length of the legs 40 is larger than the effective length of the beams 38,42 or even larger than just the half of the latter length. In that case the pressure bridges along the legs 40 will be so pronounced that by a further clamping together of the beams 38, 43 it is impossible to build up an initial pressure in the central area of the constriction before the material in the pressure bridges has been compressed to such a degree as to be damaged whereafter a complete sealing is unachievable.

This is why it is important that the binding cross section be pronounced flat between the clamping beams.

Figure 12:
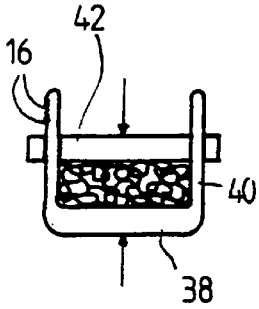

In order to provide for a complete sealing the beams 38,42 are forced further together, FIG. 12, whereby the constriction material will be positively deformed and axially expanded in each and every sub portion of the cross section. The degree of axial expansion will not be the same all over the area, but this is immaterial if it has only been achieved that in all sub portions some expansion has taken place.

Figure 13:
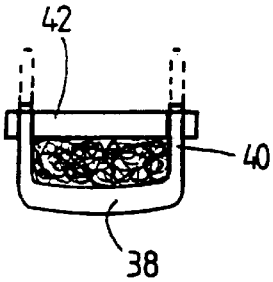
Figure 14:
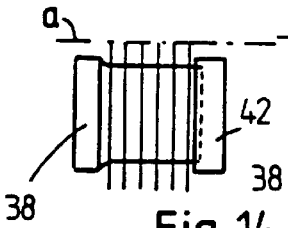
FIGS. 14–17 are corresponding longitudinally sectional views.

When the clamping tools are removed from the binder, FIG. 13, the beams may bulge out somewhat, but an associated pressure reduction in the deformed constriction area is well acceptable once the overall deformation has been obtained. Due to the barb portions 50,52 the U-member 36 is self locking in the position in which it was left by the removal of the clamping tools, but if the barbs are coarse a certain return displacement may take place, but again, this may be acceptable, particularly if the E-module of the material is low. For higher E-modules it will be preferable to use a binder of a stepless self-locking type, e.g. as shown in FIGS. 1–7.

The pressure distribution in the middle area of the constriction is shown graphically in FIGS. 14–17, in which partly common pressure levels designated a–d are shown.

Level a, which is practically zero, represents the pressure in the gathered together, but still non-compacted constriction (FIGS. 9 and 10).

Figure 15:
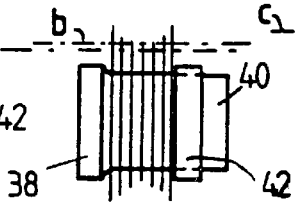
Figure 16:
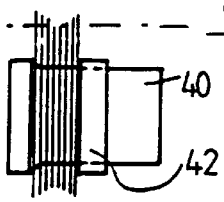

Level b, FIG. 15, represents the slightly increased pressure in the middle of the area when the clamp beams have advanced to the complete compaction of the material as discussed in connection with FIG. 11. It will be noted that the pressure next to the clamp beams is somewhat above level b.

Level c indicates the maximum pressure in the central area upon the pressure deformation of the material, FIG. 12.

Figure 17:
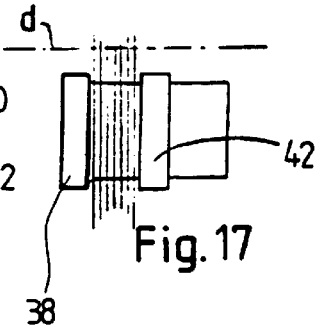

Level d, FIG. 17, indicates the final pressure upon the external clamping pressure being relieved, see FIG. 13.

The vertical lines indicating the pressure conditions in the material may as well represent the degree of axial expansion of the material.

Figure 18:
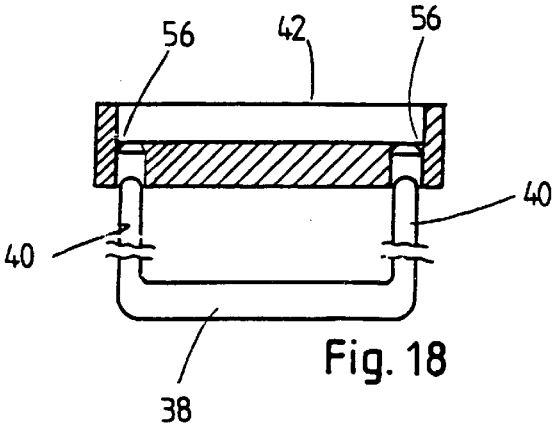
FIG. 18 is a schematic plan view of another modified binder.

FIG. 1014 13 show the situation that the legs 40 are brought to project considerably from the rear side of the clamp beam 42 and are cut off as illustrated by the dotted lines shown in FIG. 13. It should be emphasized, however, that it is both possible and highly preferential to make use of binders, which, as already discussed in connection with FIGS. 1–6, are preadapted to the production so as to make leg cutting unnecessary. FIG. 18 shows still a further self-locking binder, the legs of which are smooth, while in the receiver holes sharp internal edges 56 are provided as barbs that will but into the leg sides and thus prevent the legs from retraction from the holes.

It is essential that the binder legs do not draw the casing material into the receiver holes, i.e. the material should be kept away from the hole ends until the leg ends have been initially introduced into the holes, and the legs and the holes should be disposed such that the inner sides of the legs engage the corresponding hole edges tightly, such that the casing material cannot, during the building up of the premed intrude into the slots between the legs and the hole edges.

Ideally the beams should be very long, such that in its final shape the constriction area is almost extremely elongated, but of course this would require the clamp beams to be very heavy for securing the required stiffness thereof. In practice the area will not need to be more flat than corresponding to a substantially rectangular area with a side proportion of 1:8, normally even just to some 1:4, while a final proportion of 1:2 will mostly be too large for the achievement of an effective compaction and deformation of the entire cross sectional area.

Based on the knowledge of the cross sectional area and the type of the casing to be bound it is thus possible to preselect a suitable binder size, namely such that the final constriction area, when deformation compressed e.g. some 20–40% or as required, should be held in a rectangular opening having a side proportion normally somewhere between 1:2.5 and 1:6. Hereby the binder width (length of the clamp beams) can be at least provisionally determined. Hereafter the length of the legs 6 and 40 should be chosen such that the casing material in its loose condition (FIGS. 2, 9, 10) can be held within the U-member 2,36 so as to allow the leg ends to be initially introduced into the holes 10,44 before a pressure build-up starts in the casing material. The remaining parameter will be the thickness of the block beam 8,42, which should ideally be selected such that the final clamping stage can be reached without the free leg ends projecting substantially from the rear side of the beam. Thus, the thickness of these beams can easily be selected by a practical test.

In practice it is of course important to control the clamping such that the constriction area finally assumes the required size or thickness between the clamp beams. Inasfar as the clamping pressure should be high enough to effect flowing of the material it is necessary to either suddenly relieve the pressure when it has been measured that the effective deformation e.g. of said 20–40% has been obtained, or, preferably, to positively limit the working stroke of the clamping tool means such that the clamping displacement of the clamp beams is brought to stop when the predetermined final thickness of the constriction has been reached. The tool equipment is easy to provide with suitable adjustable stop means for this purpose.

Thus, the applied clamping pressure is not critical, when it is only high enough to effect the deformation, Normally a pressure of some 100 kp per mm of the effective width of the binder will be sufficient.

It has been found possible to set up certain theoretical and empirical expressions for an acceptable shape of the constriction area and a required minimum clamping pressure for obtaining the super sealing, based on a thorough knowledge of all relevant material constants of the casing material and the binder, but it is deemed unnecessary in the present connection to treat this in more detail, inasfar as it is possible, as mentioned, to ascertain the correct conditions by adjustments based on practical tests.

Besides, it is even believed that there will be experts still better qualified to treat the matter from a physical calculation point of view once it has now been confirmed that based on the considerations of the invention it is, after all, possible to obtain the desired result. In other words, when the result is known to be obtainable this will encourage the experts to investigate the matter further, and it will be found, then, that it is possible to scientifically verify the invention ad produce prescriptions for a success use thereof in the various production situations for obtaining a sealing effect at least 10–100 times better than so far obtained.

As already mentioned it can be advantageous to provide for an exterior holding of the constriction material outside the binder for increasing the resistance against the axial displacement of the material, whereby, particularly for a casing material of a low E-module, i.e. a relatively soft material, it will be possible to reduce both the required clamping pressure and the mutual clamping displacement of the opposed clamp beams. Hereby the clamp beams may have reduced thickness and the axial dimension of the binder may be kept low, such that a relatively cheap binder can be used. This technique is illustrated schematically in FIGS. 19 and 20, where part-cylindrical clamp members 58 are shown to be forced against the casing constriction from opposite sides adjacent both ends of the binder. The clamp members belong to the tool equipment of a machine as also having the required tools, represented by arrows 60, for clamping together the clamp beams of the binder. Care should be taken, of course, that the clamp members 58 do not compress the material sufficient to damage it. Even here, though the clamp members are shown to be arched, they should preferably be planar elements operating in positions next to the respective binder beams.

Figure 20:
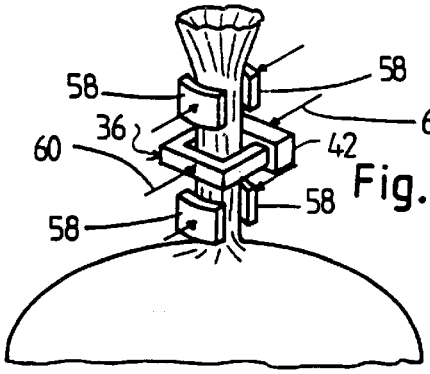
FIG. 20 is a corresponding perspective view.
Figure 21:
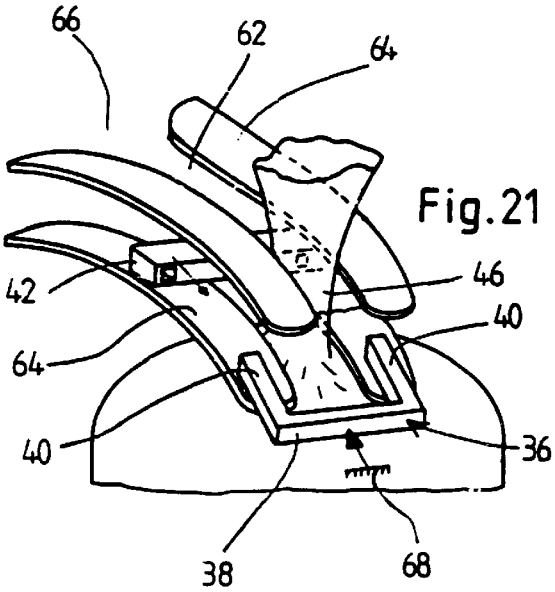
FIG. 21 is a respective view illustrating the application of a binder onto a constricted packing portion.
Figure 22:
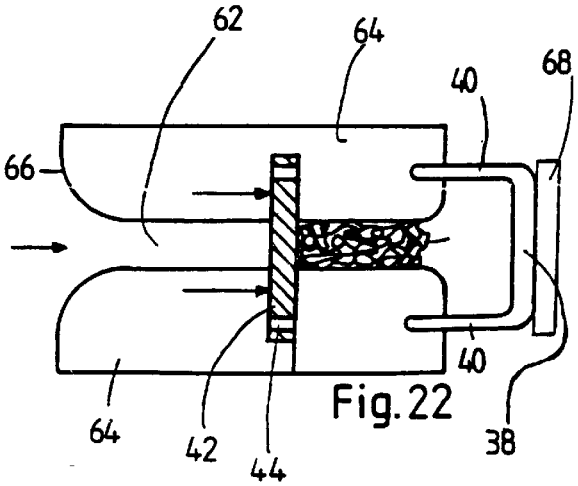
FIG. 22 is a corresponding top view, partly in section.

In FIGS. 21 and 22 it is shown that the mounting of the binder on the constriction 18,46 may be effected by moving the constriction along a slot 62 between opposed guiding plates 64, such plates being provided both above and beneath the binding level. At the inlet end the slots 62 have widened portions 66 serving to narrow the constriction area by the introduction thereof. At the discharge ends of the slots 62 the U-member 2 or 36 is held by suitable holding and backing means 68 such that the free leg ends thereof project slightly over the outer ends of the guiding plates 64. The constriction material is pushed along the slots by means of the block beam 8 or 42, which, itself, is moved by suitable driving means (not shown). Especially from the plan view of FIG. 22 it will be noted that with this arrangement it is ensured that the constriction material will be kept away from the holes in the block beam at the moment of introduction of the leg ends therein, while it is also ensured that the material can be allowed to fill out the entire binder opening already before its initial compaction by the further clamping movement of the block beam towards the opposite beam 4,38. The bound area will be laterally removable and the operation repeated. If clamp members 58 (FIGS. 19,20) are used they should be arranged above and beneath the guiding plates 64, respectively.

Finally a few examples of providing a "super sealed" closing should be given:

EXAMPLE 1:

Casing material: BC-1 Cryovac, USA.

Yield point. 450 kp/cm$^2$.

E-module: 3.600 kp/cm$^2$.

Thickness: 0.059 mm.

Peripheral length: 500 mm.

Fracture prolongation: 135%

Height of binder: 6 mm.

Effective width of binder: 7 mm.

Effective thickness of binder before deformation 4.2 mm.

Effective thickness of binder after deformation 2.8 mm.

Clamping pressure applied: 700–800 kp (clamping stop at 2.8 mm).

EXAMPLE 2:

Casing material: BT-1, Cryovac, USA.

Yield point: 500 kp/cm$^2$.

E-module: 4.600 kp/cm$^2$.

Thickness: 0.08 mm.

Peripheral length: 800 mm.

Friction coefficient (measured): 0.20.

Fracture prolongation: 130%

Height of binder: 7 mm.

Effective width of binder: 12 mm.

Effective thickness of binder before deformation: 5.4 mm.

Effective thickness of binder after deformation: 2,5 mm.

Clamping pressure applied: 1.200 kp.

Figure 19:
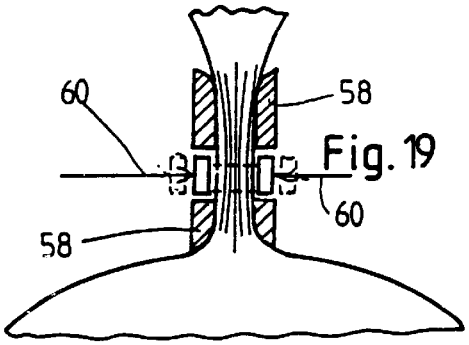
FIG. 19 is a side view, partly in section, illustrating binding operation with additional tools being use.

In this example a critical magnitude of the deformation is approached, and for increased security it could be advisable to make use of external clamping means according to FIGS. 19 and 20.

The examples are based on the nominal values of the various characteristics of the materials, and it his not been taken into account that at least some of these values may vary within inevitable tolerance limits.

| Examples | 3 | and | 4' |
|---|---|---|---|
| Material: | Polyester | | Polyethylene |
| Yield point: kp/cm$^2$ | 800 | | 130 |
| E-module: kp/cm$^2$ | 13,200 | | 2100 |
| Thickness: mm | 0.0175 | | 0,095 |
| Periphery: mm | 400 | | 800 |
| Friction coeff.: | 0,24 | | 0,27 |
| Fracture prolong.: | 25% | | 410% |

-continued

| Examples | 3 | and | 4' |
|---|---|---|---|
| Binder: | | | |
| Height mm | 5 | | 7 |
| Width mm | 4 | | 16+ |
| Thickness: Start mm | 1,75 | | 4,75 |
| Stop mm | 1,45 | | 2,6 |
| Pressure kp: | 400 | | 700 |

In Example 4 the binder width may be reduced with the use of external clamps 58, FIGS. 19 and 20.

The binder itself may consist of DELRIN or a similar hard material.

Figure 23:
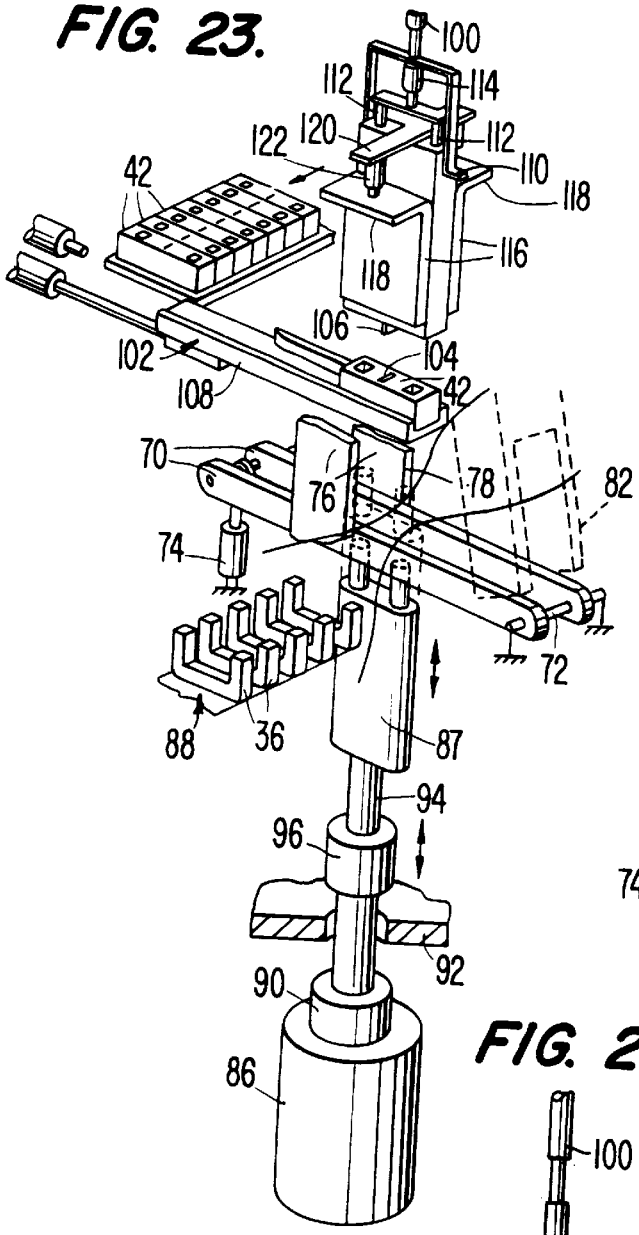
*FIGS. 23–25 are to the apparatus for mounting the binders.*

In FIG. 23 is schematically shown an apparatus for mounting the binders according to the invention. This apparatus comprises a pair of opposed, parallel beams 70 arranged substantially horizontally, carried at their front ends by a rigidly supported pivot shaft 72 and at their opposite ends being height adjustable by means of a cylinder 74. At each sides of this pair of beams is arranged a stationary plate member 76 having a vertical front edge portion 78. A constriction 30 of a tubular packing or casing may thus, as shown, be placed on or across the top edges of the beams 70 and against the edges 78, and thereafter the constriction may be arrested in this position by means of a pressing element shown in dotted lines at 82, this element being pivotable inwardly towards the constriction into a final position, in which it clamps the constriction against the edges 78 such that the horizontal thickness of the constriction will be less than the spacing between the legs 40 of the binders used for binding the products of the particular production.

Underneath this clamping area of the constriction is arranged a piston 84, the top end of which is vertically movable by means of a cylinder 86 between a lowered position, in which it is operable to receive from one side thereof a binder U-member 36 as supplied from a magazine strip generally designated by the reference numeral 88 of such members, and a raised position, in which the received U-member 36 is raised to a level, in which the bottom portion 38 of the U-member is located just above the level of the top edges of the beams 70, whereby the constriction 80 will be located between the opposed legs 40 of the U-member 36.

The cylinder 86 can raise it associated piston rod 90 only until the litter abuts a stationary abutment 92, while in the rod connection 94 to the piston 84 there is inserted a unit 96 which is adjustable to vary the effective length of the rod 94, such that it is hereby possible to accurately adjust the final raised level of the top end of the piston 84 as carrying the U-member 36.

Overhead the constriction 80 is arranged a piston 98 for bringing a clamping beam 42 down onto the constriction, this piston being moved vertically by means of a cylinder 100. The piston 98 is raisable into a position above an inlet station generally designated by the reference numeral 102 for clamping beams 42, these beam members having a central cross slot 104 which is engageable by a downwardly protruding blade member 106 on the piston 98, whereby the latter may carryingly engage the beam member upon a support 108 being retracted therefrom, whereafter the piston 98 will be operable to move the beam member 42 downwardly to engage with the upwardly protruding legs 40 of the U-member 36 and to effect a desired pressure against the top side of the constriction 80.

Figure 24:
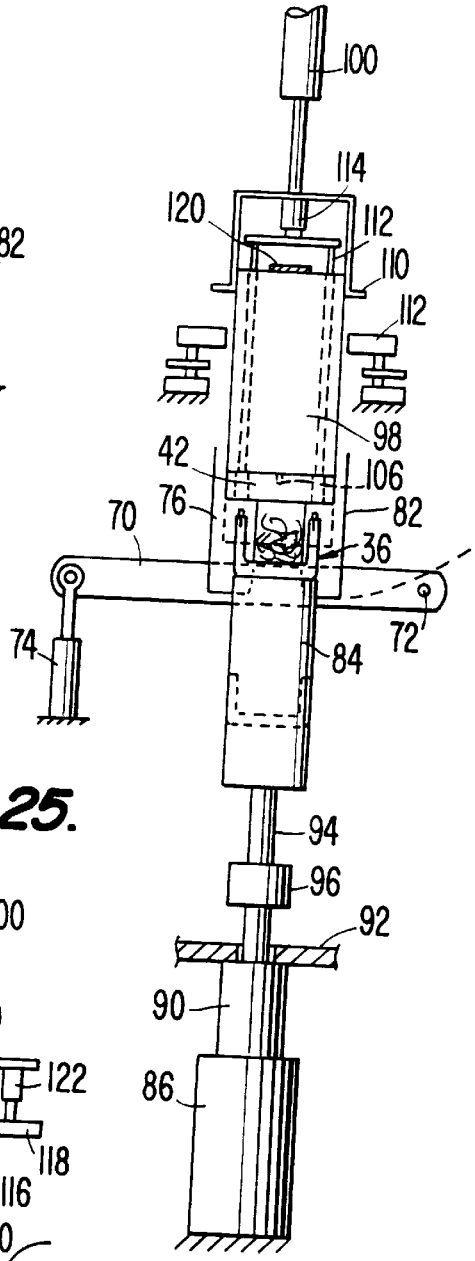
Figure 25:
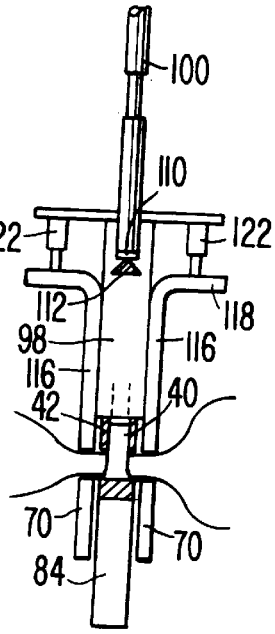

The applied pressure should be high enough to effect a flowing of the constriction material, and it is important, therefore, that the final position of the piston 98 should not be determined by the pressure applied, but rather by the final distance between the opposed surfaces of the beam member 42 and the beam portion 38 of the U-member 36. To this end, once the operative level of the piston 84 has been set, it is important to limit the downstroke of the piston 98 so as to ascertain the required final thickness of the binding area, and the piston 98, therefore, is provided with laterally projecting portions 110, which are movable against stationary, height adjustable stop means 112 (FIG. 24).

Thus, when the adjustable means 96 and 112 are properly adjusted the compaction and compression of the constriction area 80 will be stopped when needed, corresponding to the required deformation of the constriction area of producing a super sealed closure. Thereafter, when binders according to FIGS. 1–4 are used, the wedge members 14 are actuated by means of actuator rods 112 activated by a cylinder 114.

The top edges of the horizontal beams 70 are usable as one part of the disclosed external clamping means (58, FIGS. 19–20), while the other part thereof may be arranged on the piston 98 as illustrated by opposed side plates 116 thereon these plates having upper outwardly bent portions 118, which are connected with a rigid piston portion 120 through a cylinder 122, whereby the lower edges of the plates 116 may be lowered into positions resiliently clamping the constriction material outside the binder against the top edges of the lower beams 70 for obtaining the result already described. The cylinders 122 may be pressurized so as to exert the desired pressure independently of the final displacement of the piston 98.

We claim:

1. A method of closing hose or bag shaped packings, priority foodstuff packings, whereby a constricted portion of the packaging is clamped by a ring shaped non-metallic clamp binder caused to be narrowed about the constricted portion of the packing by a closing pressure applied from opposite sides thereof and fixed in its shaped as attained when it is subjected to a final closing pressure, characterized in that the constricted portion of the packing is clamped between opposed smooth surface portions of substantially straight *and substantially parallel* clamping beams of the non-metallic clamp binder so as to be compacted into a final shape, in which the constricted portion of the packing is cross-sectionally oblong in a longitudinal direction of the substantially *straight and substantially* parallel clamping beams[.], preferably with a length of at least twice a distance between the clamping beams.

2. A method according to claim 1, whereby binder portions interconnecting respective ends of the opposed clamping beams comprise at least at one end thereof a free leg member on one clamping beam operable to be received in a lockable manner in several different positions in a receiver passage in the opposite clamping beam, the method being completed with the free leg member end left uncut and yet in a non-tearing condition either by being entirely housed inside said receiver passage or, if projecting substantially beyond a rear end of the receiver passage, by having a smoothly rounded end portion.

3. A method according to claim 1, particularly for obtaining a very effective [seating] *sealing* of a constricted plastic casing material, whereby the binder is selected and the constriction disposed in such a manner that in the said final shape of the binder the binder opening is entirely filled out by the constriction material, said constriction material being subjected to such a compaction pressure between the clamping beams that in each and every part of the final constriction area the plastic material is effectively axially displaced to a degree below rupture prolongation and thus assumes an overall axially expanded condition.

4. A method according to claim 3, whereby the applied pressure is steadily sufficient to deform the constriction material and the opposed clamping beams are caused to be mechanically stopped at such a mutual distance, which corresponds to the effective distance between the clamping beams being of a size required for ensuring the overall axial expansion of the material.

5. A method according to claim 4, whereby, in order to counteract a rupture prolongation of the axially expanding material with the use of a binder of relatively small axial length the constricted material portions just outside the opposed ends of the binder are mechanically clamped between clamp tool members and thus axially stabilized while the clamping [beam] *beams* are forced into their final positions.

6. A clamp binder for closing hose or bag shaped packings by the method claimed in one of claims 1 or 3, the clamp binder consisting essentially of a non-metallic material and comprising two opposed clamping portions and connector means therebetween for confining, together with the clamping portions, an annular binder structure, in which at least one of said connector means is operable to interlock the associated parts of the clamping portions with a mutual spacing therebetween upon the clamping portions being forced against a constricted packing portion from opposite sides thereof, characterized in that the opposed clamping portions are constituted by substantially straight clamping beams and that the connector means are arranged so as to enable the binder to be closed about a non-compacted constriction area and enable the clamping beam to be forced together to compress the constriction area into a final shape, in which the beams are substantially parallel and spaced from each other at a spacing less than the spacing between the respective connector means.

7. A binder according to claim 6, in which one of the clamping beams is at each end provided with a laterally protruding leg member so as to form a rigid U-member with a tight bottom portion, while the outer clamping beam is provided with two individual holes for receiving the leg members, arresting means being provided in connection with each leg member and/or hole operable to lock the leg members against retraction from the holes.

8. A binder according to claim 7, in which the arresting means comprise wedge members projecting from the free ends of the leg members so as to be [introducable] *introducible* into the holes along with the leg ends and to be repressable from the opposite end of the holes for widening the cross sectional area of the leg ends sufficiently to effect a retraction locking of the leg member in the hole.

9. A machine for mounting a clamp binder on a constricted packing portion in accordance with the method claimed in one of claims 1, 3 or 5, the machine comprising means for forcing opposed binder portions against the constricted portion of the packing and characterized in further comprising clamping tool means operable to clamp the constricted material just outside opposed axial ends of the clamp binder for [stablizing] *stabilizing* the material against excessive axial displacement in an area surrounded by the clamp binder.

*10. A clamp binder for closing hose or bag shaped packings by the method claimed in one of claims 1 or 3, the clamp binder consisting essentially of a non-metallic material and comprising two opposed substantially smooth clamping portions and connector means therebetween for confining, together with the clamping portions, an annular*

*binder structure, in which at least one of said connector means is operable to interlock the associated parts of the clamping portions with a mutual spacing therebetween upon the clamping portions being forced against a constricted packing portion from opposite sides thereof, characterized in that the opposed clamping portions are constituted by substantially straight clamping beams and that the connector means are arranged so as to enable the binder to be closed about a non-compacted constriction area and enable the clamping beams to be forced together to compress the constriction area into a final shape, in which the beams are substantially parallel and spaced from each other at a spacing less than the spacing between the respective connector means.*

*11. A binder according to claim 10, in which one of the clamping beams is at each end provided with a laterally protruding leg member so as to form a rigid U-member with a straight bottom portion, while the outer clamping beam is provided with two individual holes for receiving the leg members, arresting means being provided in connection with each leg member and/or hole operable to lock the leg members against retraction from the holes.*

*12. A binder according to claim 11, in which the arresting means comprise wedge members projecting from the free ends of the leg members so as to be introducible into the holes along with the leg ends and to be repressable from the opposite end of the holes for widening the cross sectional area of the leg ends sufficiently to effect a retraction locking of the leg member in the hole.*

*13. A machine for mounting a clamp binder on a constricted packing portion in accordance with the method claimed in one of claims 1, 3, or 5, the machine comprising:*

*a first beam;*

*a second beam disposed parallel to the first beam;*

*a first plate member disposed on the first beam;*

*a second plate member disposed on the second beam in opposition to the first plate member;*

*pressing means for pressing the constricted portion of the packing against edges of the first and second plate members, thereby holding the constricted portion of the packing between the pressing means and the edges of the first and second plate members; and*

*forcing means for forcing the clamping beams of the clamp binder against a portion of the constricted portion of the packing disposed between the first and second beams, the forcing means including clamping means for clamping the constricted portion of the packing against the first and second beams, thereby increasing a resistance against axial displacement of the portion of the constricted portion of the packing against which the clamping beams are forced by the forcing means.*

*14. A method of closing a hose or bag shaped packing made of a non-plastic material by mounting, applying pressure to, and fixing a non-metallic clamp binder about a constricted portion of the packing, wherein in order to provide an effective closure of the packing and an extremely firm fixation of the clamp binder on the constricted portion, the clamp binder comprises two opposed parallel substantially straight clamping beams having substantially smooth clamping surfaces and two connecting legs for connecting the two clamping beams together, the clamp binder having a size relative to a size of the constricted portion such that when the clamp binder is fixed about the constricted portion, the constricted portion almost entirely fills an opening defined by the clamping beams and the connecting legs, the opening being oblong in a longitudinal direction of the clamping beams and having a length at least twice as great as a distance between the clamping beams, the method comprising the steps of:*

*arranging the constricted portion such that after the clamp binder is fixed about the constricted portion, the constricted portion will almost entirely fill the opening in response to the clamping beams being forced against opposite sides of the constricted portion;*

*mounting the clamp binder about the constricted portion;*

*applying pressure to the clamping beams to force the clamping beams against opposite sides of the constricted portion, the applied pressure being slightly less than a pressure at which the clamping beams will cause pressure damage to the constricted portion; and*

*interlocking the clamping beams together with the connecting legs while maintaining the applied pressure on the clamping beams, thereby fixing the clamp binder on the constricted portion.*

*15. A method of closing a hose or bag shaped packing made of a plastic material by mounting, applying pressure to, and fixing a non-metallic clamp binder about a constricted portion of the packing, wherein in order to provide an extremely effective closure of the packing and a firm fixation of the clamp binder on the constricted portion, the clamp binder comprises two opposed parallel substantially straight clamping beams having substantially smooth clamping surfaces and two connecting legs for connecting the two clamping beams together, the clamp binder having a size relative to a size of the constricted portion such that when the clamp binder is fixed about the constricted portion, the constricted portion entirely fills an opening defined by the clamping beams and the connecting legs, the opening being oblong in a longitudinal direction of the clamping beams and having a length at least twice as great as a distance between the clamping beams, the method comprising the steps of:*

*mounting the clamp binder about the constricted portion such that the constricted portion does not entirely fill the opening;*

*applying pressure to the clamping beams to force the clamping beams against opposite sides of the constricted portion such that the constricted portion entirely fills the opening;*

*applying additional pressure to the clamping beams such that each portion of the constricted portion is deformed and axially expanded; and*

*interlocking the clamping beams together with the connecting legs when each portion of the constricted portion has been deformed and axially expanded, thereby fixing the clamp binder on the constricted portion;*

*wherein a pressure on the order of 50–100 kp per mm of effective width of the clamp binder is required to produce the deformation and axial expansion of each portion of the constricted portion.*

*16. A packing in combination with an annular binder, the packing comprising a bag or hose shared sheet packing material, the packing being closed at least at one end by the annular binder being clamped about a constriction of the material, wherein the binder is made of plastic and comprises two opposed clamping portions and opposed connector portions therebetween, the clamping portions being arranged so as to face each other with substantially flat, smooth and parallel surfaces, the clamping portions being held by said connector portions so as to firmly clamp the*

*constriction in a configuration, by which the cross sectional dimension of the constriction normal to the said surfaces is noticeably smaller than the width dimension of the constriction.*

*17. A packing in combination with an annular binder according to claim 16, wherein the packing material is of plastic, and wherein the constriction is arranged to entirely fill out the annular binder, the constriction material being clamped by the binder to such a degree that the constriction material in each and every cross sectional sub area thereof assumes a state physically prolonged in the axial direction of the constriction as a result of the material being clamped sufficiently to undergo a real deformation flowing all over the binding area without being locally damaged.*

*18. A machine for mounting a clamp binder on a constricted packing portion of a plastic material, the clamp binder including opposed clamp binder portions, the machine comprising:*

*first clamping means for clamping the clamp binder portions against the constricted packing portion with a force sufficient to cause the plastic material in the constricted packing portion to undergo a flowing deformation in an axial direction of the clamp binder;*

*mechanical stop means for defining a minimum spacing between the clamp binder portions to prevent excessive clamping of the constricted packing portion by the first clamping means; and*

*locking means for locking together the clamp binder portions in an annular configuration about the constricted packing portion while the clamp binder portions are clamped against the constricted packing portion.*

*19. A machine according to claim 18, further comprising second clamping means for clamping the constricted packing portion lust beyond opposed axial ends of the clamp binder to stabilize the plastic material against excessive axial displacement in the constricted packing portion clamped between the clamp binder portions.*

*20. A machine for mounting a clamp binder on a constricted packing portion, the clamp binder including opposed substantially parallel and substantially straight clamp binder portions with substantially smooth clamping surfaces, the clamp binder portions including connector portions provided at opposite ends of the clamp binder portions, the connector portions being operable to be individually interlocked upon being brought together, the machine comprising:*

*opposed clamping members;*

*means for disposing the clamp binder portions between the clamping members;*

*forcing means for forcing the clamping members towards each other while the clamp binder portions are disposed therebetween to clamp the clamp binder portions against the constricted packing portion such that the clamped clamp binder portions define an oblong opening having a length in a longitudinal direction of the clamp binder portions at least twice as great as a final distance between the clamp binder portions; and*

*locking means for individually interlocking the connector portions at the opposite ends of the clamp binder portions while the clamp binder portions are clamped against the constricted packing portion.*

* * * * *